Patented June 17, 1952

2,601,112

UNITED STATES PATENT OFFICE 2,601,112

SALINE COMPOSITION

Louis Freedman, Mount Vernon, N. Y., assignor to U. S. Vitamin Corporation, New York, N. Y., a corporation of Delaware No Drawing. Application March 31, 1950, Serial No. 153,305

15 Claims. (Cl. 99—143)

The invention relates to a composition of matter having saline properties. More particularly, it pertains to a composition which comprises in combination a plurality of edible, water-soluble salts, and includes correlated improvements and discoveries whereby a composition having pronounced salinity is produced.

It has been recognized that in diseases of the heart and vascular diseases, the sodium content of the diet increases the tendency of the tissues to accumulate fluids, thus putting an added burden on the cardiac muscles.

Further, it is considered as medically essential, that persons suffering from congestive heart disease, vascular diseases of coronary origin, hypertension associated with heart disease, liver cirrhosis with ascites, and certain types of nephrosis accompanied by edema, must depend on a low salt (sodium chloride) containing diet. In addition, it is essential that little or no common salt, i. e., sodium chloride, be consumed as a condiment for seasoning purposes. The prohibition of common salt in the diet seriously affects the taste and, ultimately, the acceptance of such foods by those persons normally accustomed to salt seasoned foods. Thus, a sodium-free seasoning agent which can be used successfully in place of common salt would be highly useful, and have valuable thereapeutic application. A sodium-free seasoning agent should, in addition to resembling common salt physically, that is, in appearance; taste; adaptability, etc., be non-toxic, and must be without deleterious accumulative effect when consumed over long periods. Moreover, it should be non-irritating and stable under normal conditions of culinary use, and readily available and relatively inexpensive.

The taste of a salt depends on the cation, Na, K, NH$_4$, etc., which determines the intensity, and upon the anion, Cl, Br, I, etc., which gives the character. Compounds of sodium and lithium are salty, compounds of potassium are salty and bitter, and compounds of cesium and rubidium are bitter. Chlorides, thiocyanates and acetates are usually salty, bromides slightly bitter and iodides definitely bitter. The taste receptors of the individual, which may show extremes in variation, may play a part in the taste of a compound, but in general the main salt taste of a substance appears to be due to the degree of ionization and to the free anions present.

The sodium-free salts which can be used to replace common salt for purposes of seasoning food are, thus, relatively few in number. Potassium chloride and ammonium chloride, and combinations thereof have been used to replace common salt. While they have a saline taste, they also have certain disadvantages, such as a metallic or bitter aftertaste, which causes them to be unsatisfactory for seasoning purposes when used continuously over relatively long periods.

There is also a distinct difference in the initial taste of the dry salts per se when placed on the tongue, as compared with the taste of solutions of the same salts in water. Thus, ammonium chloride, because of its rapid solubility in water and its negative heat of solution, has a marked initial cooling effect on the tongue which, to many, is disagreeable. This cooling effect, which can be described as a "biting taste," is followed by a deep saline taste. When potassium chloride, however, is placed directly on the tongue, it has a direct and immediate saline taste, followed by a degree of bitterness which may vary in effect with different individuals.

An object of the invention is the provision of a composition which has marked saline characteristics and which possesses also distinctive therapeutic application.

Another object of the invention is to provide a composition which is free from sodium salts and which is well adapted as a saline seasoning and flavoring material due to enhancement of salinity and reduction of bitterness.

A further object of the invention is the provision of a composition having the above-mentioned qualities and which may be readily, economically and effectively produced to a desired extent.

An additional object of the invention is the provision of a composition which contains a plurality of salts which are free from sodium and which in the combination gives a saline taste which in intensity is at least equal to or greater than that of an equal amount of any one of the individual sodium-free constituents, or the sum of such constituents, and which also is without the disagreeable taste and unsatisfactory saline seasoning properties of any of the constituents.

A still further object of the invention is the production of a composition consisting essentially of a plurality of salts which are free from sodium and which in combination give a saline seasoning taste at least equal to or greater than that of an equal weight of sodium chloride, i. e., common salt.

A particular object of the invention is the provision of a composition containing chiefly water-soluble, edible salts of potassium and ammonium in combination with a salt of choline, which is chemically (beta-hydroxyethyl) trimethyl ammonium hydroxide, and which combination has saline seasoning and flavoring properties equal to or greater than that of common salt.

Other objects of the invention will in part be obvious and will in part appear hereinafter.

The invention accordingly comprises a composition of matter possessing the characteristics, properties and the relation of constituents which will be exemplified in the composition hereinafter described and the scope of the invention which will be indicated in the claims.

I have discovered that salts of choline having an acid reaction in aqueous solution, particularly, salts of choline which alone have only a slight or no saline taste, cause combinations of salts, as potassium chloride and ammonium chloride, to blend so that the resulting composition has a lasting saline seasoning taste which is free from the bitterness normally associated with those salts. Thus, while choline dihydrogen citrate has only a slight salty taste, nevertheless, it does have an acid or astringent taste which, in intensity, but not necessarily salinity, is deeper than that of a solution of the same concentration, weight to volume, of sodium chloride. The following table gives an approximate comparison of intensities of taste of solutions, weight to volume, of ammonium chloride, potassium chloride, choline dihydrogen citrate and choline chloride, as compared with a ten per cent solution, weight to volume, of sodium chloride.

| Compound | Per cent—weight to volume | Taste Intensity |
| --- | --- | --- |
| NaCl | 10.0 | 10.00 |
| $NH_4Cl$ | 6.0 | 16.60 |
| KCl | 12.0 | 8.33 |
| Choline dihydrogen citrate | 7.0 | 14.30 |
| Choline chloride | 10.0 | 10.00 |

The reciprocal of the percent of each solution indicates the taste intensity of such compound as compared with sodium chloride.

In the practice of the invention, therefore, a composition is produced which comprises in combination an edible mixture of water-soluble salts of potassium and ammonium in a major proportion, and a salt of choline having an acid reaction in a minor proportion. It is desirable also to include in view of the hygroscopicity of some of the compounds, a caking retardent. The salts, more especially, of potassium and ammonium that may be utilized are the chlorides, sulfates and acetates. Further, the potassium salt may be present in an amount from about 40% to about 70%, and preferably about 68%; and the ammonium salt in an amount from about 14% to about 30%, and desirably about 19%. The salt of choline may be selected from the group consisting of the chloride, sulfate, dihydrogen citrate and bitartrate and these salts may be present either singly or in compatible combinations with the amount thereof being from about 8% to about 20%, and preferably about 10%. The caking retardent material may vary in an amount depending upon the combination of salts entering into the composition, and the retardent may be a stearate, as magnesium and calcium stearates; a starch, which may be corn, potato or wheat starch; and tricalcium phosphate.

Hence, I have found that the addition of a minor proportion of a choline salt having an acid reaction such as choline chloride, sulfate, dihydrogen citrate or bitartrate to a combination in a major proportion of, e. g., ammonium chloride and potassium chloride, produces a composition which no longer has the disagreeable taste qualities of the major saline-active constituents, but does have a salinity which exceeds the sum of the saline tastes of those constituents.

As illustrative embodiments of the manner in which the invention may be practiced, the following examples are presented. The parts are by weight.

*Example 1*

Sixty parts of potassium chloride in powder or crystalline form and 15 parts of ammonium chloride in powder or crystalline form are ground or mixed together in a mortar. Eight parts of choline dihydrogen citrate and 2 parts of choline chloride, previously mixed together with approximately 3.0 parts of magnesium stearate and 12 parts of fine powdered corn starch are then added and the whole mixed and blended to a homogeneous powdery dry mass of approximately 40–60 mesh—U. S. Standard sieve. This product is suitable for dispensing from a shaker container such as one having a cap with multiple perforations.

The choline salts are hygroscopic, the chloride being considerably more so than the citrate, and the magnesium stearate and corn starch are utilized to obviate the taking up of an undue amount of moisture with resultant caking, and have been above referred to as "caking retardents."

*Example 2*

Forty-four parts of powdered potassium chloride and 14 parts of powdered ammonium chloride are combined by blending or comminuting in a tumbler or mill, with a previously prepared mixture of 12 parts of choline dihydrogen citrate, 6 parts of choline chloride, 10 parts of magnesium stearate and 14 parts of corn starch. The mixing and blending continues until a uniform mixture having a particle size of approximately 40–60 mesh is obtained. This composition has a taste resembling common salt and is suitable for use in a shaker as a substitute for common salt. The magnesium stearate may be entirely replaced by corn starch, the latter acting as agent to protect the composition from taking up moisture and caking.

*Example 3*

Sixty-eight and one-half parts of powdered potassium chloride and 19.5 parts of powdered ammonium chloride are combined by blending and comminuting with 9 parts of choline dihydrogen citrate. Three parts of powdered tricalcium phosphate are added to act as a caking retardent and the mass is thoroughly blended. The entire blend is then triturated in, e. g., a pony mixer or granulater with 8–10 parts by weight of water with formation of a moist granular mass. The granular mass is forced through a No. 16 screen, and the granulation dried in shallow trays in a warm air dryer, or other suitable heating apparatus, at a temperature of approximately 60° C. for about 1 hour. The length of drying time depends, of course, on the size of the batch. The drying temperature may be lowered and the time shortened by use of a vacuum dryer. The dried granular product is ground in, e. g., a Fitzpatrick comminuter and screened to give a uniform granular powder of 40–60 mesh having a composition approximately as follows: Potassium chloride—68.5%; ammonium chloride—19.5%;

choline dihydrogen citrate—9.0% and tricalcium phosphate—3.0%.

Based on the taste intensities of the constituents shown in the above table, the foregoing composition should have theoretically a taste intensity of 9.65. Actually the composition based on the taste of a 10% solution (the consensus of opinion of several chemists as tasters) has a taste intensity of 13.3.

Example 4

Sixty-eight parts of powdered potassium chloride and 19 parts of powdered ammonium chloride are combined by blending and comminuting with 9 parts of powdered choline bitartrate. One part of citric acid and 3 parts of powdered tricalcium phosphate are added and the whole thoroughly blended in a blender or tumbler. The entire blend is then triturated in a pony mixer or comminuter with 8 to 10 parts of water and the whole formed into a moist granular mass. This moist granular mass is then processed as described in Example 3. By the same taste test, the intensity of this composition should theoretically be 10.5. Actually the composition was found to have a taste intensity of 15.4.

In addition to the compositions in dry form described in the foregoing examples, new and effective compositions can be prepared in liquid form. Although these latter may be limited in their practical applications, they nevertheless have certain utility. Thus, they may be used in hospitals and institutions in the preparation of foods which are part of diets prepared for patients for whom common salt is prohibited as a seasoning agent. A suitable composition in liquid form is the following.

Example 5

14.4 parts of potassium chloride and 5 parts of ammonium chloride are dissolved in 50 parts of distilled or deionized water. Fresh water having a low hardness count and substantially free from sodium may be used. Five parts of choline chloride, 1.45 parts of choline dihydrogen citrate and 1.45 parts of potassium citrate are dissolved in 22 parts of water of the above purity. The two solutions are then mixed to give approximately 100 parts of a clear saline-tasting solution having a specific gravity of 1.25 and a pH value of approximately 4.6. This solution has a solid content of approximately 28% which, under normal conditions, is mold and bacterio-static. Variations of from 5 to 10% more or less in any of the solid ingredients may be made in the compositions without departing from the scope of stabilizing a sodium-free saline-tasting liquid composition suitable for culinary saline seasoning use. Thus, any one or all of the solid ingredients can each be increased by approximately 10% without appreciably affecting the taste or utility of the solution.

Another example of a composition in liquid form is as follows.

Example 6

Fifteen parts of potassium chloride and 7.5 parts of ammonium chloride are dissolved in 50 parts of water of the purity described in Example 5. To this solution is added with proper mixing, a solution made by dissolving 1.5 parts of choline chloride and 1.5 parts of choline dihydrogen citrate in 24.5 parts of water. The finished solution is distinctly acid (pH 3.4–3.5) and has an acidy, saline taste quite suitable for culinary flavoring and saline seasoning purposes. Such a solution has a solid content of approximately 25.5%. Potassium benzoate, or aseptoform compounds in an amount up to about 0.2% may be added to prevent mold and/or bacterial growth.

As above stated, the amount of potassium salt, as potassium chloride, used in the composition may be varied from about 40% to about 70%, with about 68% being preferred, and the amount of the ammonium salt, as ammonium chloride, may vary indirectly in conformity with the increase or decrease in the amount of the potassium chloride, the ammonium salt being in an amount from about 14% to about 30% of the entire composition, and preferably about 19%.

Moreover, variations in the amount of the choline compounds can be made from about 8% to about 20%, without appreciably affecting the taste-balancing properties of the choline salts when blended with the inorganic salts, as the chlorides. Thus, as much as 20%, but preferably 10%, of the choline compounds may be incorporated in the final composition, and the choline ingredient may be one or a compatible mixture of choline salts in varying proportions. However, it is desirable to have a preponderance of a weaker acid salt of choline such as choline dihydrogen citrate or choline bitartrate, over a more strongly acid choline salt such as choline chloride. Example 2 shows such a composition.

Further, a satisfactory composition may be obtained by use of choline dihydrogen citrate alone or choline bitartrate alone as the saline taste blending agent. In such a composition, because of the lower degree of hygroscopicity of such choline compounds, corn starch, or magnesium stearate, or other caking retardent may be omitted or a smaller amount thereof utilized, thus increasing the percentage of the saline-active ingredient and making the final composition comparatively more effective as a saline seasoning agent. An example of such a composition is given in Example 3 above.

Iodine may be incorporated in the composition, either solid or liquid, in the form of potassium iodide for use in those, so-called goiterous, regions where iodine deficiency in drinking waters or in the soil is known to exist, such as in the inland lake regions of the United States. To incorporate the iodine in the composition so that it will not undergo oxidation and give off free iodine, it is first necessary to mix the potassium iodide with approximately 4% of its weight of potassium thiosulfate to form a thio complex with iodine. Since the amount of iodide required in the composition is necessarily small, of the order of 0.01% to 0.1%, the amount of the thio-iodine complex present in the composition is too small to affect the saline taste of the composition.

These compositions are well suited by their physical properties to be used as a substitute for common salt. The solid compositions have all of the aesthetic properties of common salt in appearance, pourability from a "salt" shaker, salty taste for flavoring and seasoning purposes, stability under all normal culinary conditions, freedom from bitterness and disagreeable taste usually found in mixtures of organic chlorides other than sodium chloride, and freedom from toxic effects when used as a sodium-free seasoning agent. Foods seasoned with such a composition are rendered palatable and acceptable to those suffering from conditions requiring the prohibition of use of sodium chloride, thus enhancing the effectiveness of other therapeutic measures prescribed in conjunction with such prohibition.

Since certain changes may be made in the above composition of matter and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An edible composition comprising a mixture of water-soluble saline tasting salts of potassium and ammonium in a major proportion, and a salt of choline having an acid reaction in a minor proportion.

2. An edible composition comprising a mixture of water-soluble saline tasting salts of potassium and ammonium in a major proportion, and a salt of choline selected from the group consisting of the chloride, sulfate, dihydrogen citrate and bitartrate in a minor proportion.

3. An edible composition comprising a mixture of chlorides of potassium and ammonium in a major proportion, and a salt of choline having an acid reaction in a minor proportion.

4. An edible composition comprising a mixture of chlorides of potassium and ammonium in a major proportion, and a salt of choline selected from the group consisting of the chloride, sulfate, dihydrogen citrate and bitartrate in a minor proportion.

5. An edible composition comprising a mixture of water-soluble saline tasting salts of potassium and ammonium in a major proportion, a salt of choline having an acid reaction in aqueous solution in a minor proportion, and a caking retardent.

6. An edible composition comprising a mixture of chlorides of potassium and ammonium in a major proportion, a salt of choline selected from the group consisting of the chloride, sulfate, dihydrogen citrate and bitartrate in a minor proportion, and a caking retardent.

7. An edible composition comprising a mixture of chlorides of potassium and ammonium in a major proportion, a salt of choline selected from the group consisting of the chloride, sulfate, dihydrogen citrate and bitartrate in a minor proportion, and a small amount of tricalcium phosphate.

8. An edible composition consisting of an aqueous solution having a solute comprising a mixture of water-soluble, saline tasting salts of potassium and ammonium in a major proportion, and a minor proportion of a salt of choline having an acid reaction.

9. An edible composition consisting of an aqueous solution having a solute comprising the chlorides of potassium and ammonium in a major proportion, and the chloride and dihydrogen citrate of choline in a minor proportion.

10. An edible composition consisting essentially of the chlorides of potassium and ammonium in a major proportion, and choline dihydrogen citrate in a minor proportion.

11. An edible composition consisting essentially of the chlorides of potassium and ammonium in a major proportion, choline dihydrogen citrate in a minor proportion, and a caking retardent.

12. An edible composition containing potassium chloride from about 40% to about 70%, ammonium chloride from about 14% to about 30%, from about 8% to about 20% of a salt of choline having an acid reaction, and a caking retardent.

13. An edible composition containing potassium chloride from about 40% to about 70%, ammonium chloride from about 14% to about 30%, choline dihydrogen citrate from about 8% to about 20%, and tricalcium phosphate.

14. An edible composition containing potassium chloride from about 40% to about 70%, ammonium chloride from about 14% to about 30%, choline dihydrogen citrate from about 8% to about 20%, and a moisture retardent.

15. An edible composition containing potassium chloride from about 40% to about 70%, ammonium chloride from about 14% to about 30%, and a mixture of choline dihydrogen citrate and choline chloride totalling from about 8% to about 20% and being in a ratio of citrate to chloride of between about 4:1 and 1:1.

LOUIS FREEDMAN.

REFERENCES CITED

The following references are of record in the file of this patent:

UNITED STATES PATENTS

| Number | Name | Date |
|---|---|---|
| 1,874,055 | Liebrecht | Aug. 30, 1932 |
| 2,471,144 | Davy | May 24, 1949 |

FOREIGN PATENTS

| Number | Country | Date |
|---|---|---|
| 421,554 | Great Britain | Dec. 24, 1934 |

OTHER REFERENCES

"The Chemical Senses," by Moncrieff, Leonard Hill Limited, 17 Stratford Place, W. 1, London, 1944, page 252.